US011718765B2

(12) United States Patent
Jacquel et al.

(10) Patent No.: US 11,718,765 B2
(45) Date of Patent: Aug. 8, 2023

(54) POLYURETHANE COATING COMPRISING ISOSORBIDE

(71) Applicant: ROQUETTE FRERES, Lestrem (FR)

(72) Inventors: Nicolas Jacquel, Lambersart (FR); René Saint-Loup, Lomme (FR); Jean-Pierre Pascault, Villeurbanne (FR); Héloïse Blache, Canteleu (FR); Alain Rousseau, Saint-Priest (FR); Françoise Mechin, Lyons (FR); Etienne Fleury, Soucieu en Jarrest (FR)

(73) Assignee: Roquette Freres, Lestrem (FR)

( * ) Notice: Subject to any disclaimer, the term of this patent is extended or adjusted under 35 U.S.C. 154(b) by 274 days.

(21) Appl. No.: 16/758,714

(22) PCT Filed: Oct. 26, 2018

(86) PCT No.: PCT/FR2018/052664
§ 371 (c)(1),
(2) Date: Apr. 23, 2020

(87) PCT Pub. No.: WO2019/081867
PCT Pub. Date: May 2, 2019

(65) Prior Publication Data
US 2020/0339834 A1    Oct. 29, 2020

(30) Foreign Application Priority Data

Oct. 27, 2017 (FR) ..................... 17 60155

(51) Int. Cl.
| *C09D 175/08* | (2006.01) |
| *C08G 18/08*  | (2006.01) |
| *C08G 18/32*  | (2006.01) |
| *C08G 18/48*  | (2006.01) |
| *C08G 18/72*  | (2006.01) |
| *C08G 18/75*  | (2006.01) |
| *C08G 18/79*  | (2006.01) |

(52) U.S. Cl.
CPC ....... *C09D 175/08* (2013.01); *C08G 18/0852* (2013.01); *C08G 18/3218* (2013.01); *C08G 18/4854* (2013.01); *C08G 18/725* (2013.01); *C08G 18/755* (2013.01); *C08G 18/792* (2013.01); *C08G 2150/00* (2013.01)

(58) Field of Classification Search
CPC ............ C08G 18/0852; C08G 18/3218; C08G 18/4854; C08G 18/725; C08G 18/755; C08G 18/792; C08G 2150/00; C09D 175/08
See application file for complete search history.

(56) References Cited

U.S. PATENT DOCUMENTS

| 2005/0143549 A1 | 6/2005 | Schijndel et al. |
| 2010/0184938 A1 | 7/2010 | Robinson et al. |
| 2016/0282515 A1 | 9/2016 | Tsukada et al. |
| 2017/0342189 A1 | 11/2017 | Nakagawa et al. |

FOREIGN PATENT DOCUMENTS

| EP | 3222644 A1 | 9/2017 |
| WO | 2009088456 A2 | 7/2009 |
| WO | WO 2016/159723 | * 10/2016 |

OTHER PUBLICATIONS

Odian, George, Principles of Polymerization, Third Edition, John Wiley and Sons, Inc., 1991, pp. 29-33.*
The English translation of the International Search Report, dated Dec. 13, 2018, in the corresponding PCT Appl. No. PCT/FR2018/052664.
Fenouillot F et al: "Polymers from renewable 1.4:3,6-dianhydrohexitols", Progress in Polymer Science, Pergamon Press, Oxford, GB vol. 35, No. 5, May 1, 2010 (May 1, 2010), pp. 578-622, XP002674686.
Romina Marin, Sebastian Munoz-Guerra: "Carbohydrate-Based Poly-(ester-urethane)s: A comparative Study Regarding Cyclic Alditols Extenders and Polymerization Procedures", Journal of Applied Polymer Science, vol. 114, Aug. 17, 2009 (Aug. 17, 2009), pp. 3723-3736, XP002782546.
The English translation of the Japanese Office Action, dated Aug. 30, 2022, in the related Japanese Appl. No. 2020-523368.

* cited by examiner

*Primary Examiner* — Patrick D Niland

(57) ABSTRACT

The present invention relates to a crosslinkable composition for forming a polyurethane coating on different types of substrate. The present invention relates in particular to a polyurethane composition comprising isosorbide as a diol chain extender, and to the polyurethane coating obtained from this composition.

11 Claims, No Drawings

POLYURETHANE COATING COMPRISING ISOSORBIDE

CROSS-REFERENCE TO RELATED APPLICATIONS

This application is a National Stage Application of PCT/FR2018/052664 filed Oct. 26, 2018, which claims priority from French Patent Application No. 17 60155, filed on Oct. 27, 2017. The priority of said PCT and French Patent Application are claimed. Each of the prior mentioned applications is hereby incorporated by reference herein in its entirety.

TECHNICAL FIELD OF THE INVENTION

The present invention relates to a crosslinkable composition for forming a polyurethane coating on different types of substrates. The present invention relates in particular to a polyurethane composition comprising isosorbide as chain-extender diol and to the polyurethane coating obtained from this composition.

PRIOR ART

Many industries require compositions for forming coatings on substrates. The coatings may, for example, be protective, decorative or surface-treatment coatings.

The great versatility of polyurethanes make them a material of choice for coatings. With a very wide hardness range, very good impact resistance and resistance to cracking and very good chemical resistance, they are suitable for coating all types of surfaces.

A crosslinked polyurethane coating is conventionally obtained by reaction of a long-chain polyol, a short-chain diol and a polyisocyanate. Various compounds are described in the literature for each of these reagents. In general, at least one of the two mixtures, either the mixture of polyols or the mixture of polyisocyanates, has a functionality strictly greater than two in order to obtain a network. The amount of compounds with functionality greater than or equal to 2 makes it possible to adapt the crosslinking density and is therefore one of the solutions for adapting the properties of the network.

The polyisocyanate is generally an aliphatic polyisocyanate or a mixture of aliphatic polyisocyanates with an —NCO functionality strictly greater than 2 when used with polyols with average functionality equal to two. Indeed, compared with aromatic polyisocyanates, aliphatic polyisocyanates make it possible to obtain coatings which advantageously resist yellowing when exposed to light. The —NCO functionality strictly greater than 2 makes it possible to obtain a crosslinked polyurethane.

The long-chain polyol is generally a polyether polyol diol or a polyester polyol or a polycarbonate polyol which may in particular have a molecular weight of 400 to 4000 g/mol.

The short-chain diol, also called chain-extender diol, is usually 1,4-butanediol.

The long-chain polyol gives flexibility to the polyurethane coating. The short-chain diol contributes, with the polyisocyanate, to the hardness of the coating.

A polyurethane coating conventionally has a single glass transition temperature (Tg). Indeed, a coating obtained with a material exhibiting phase segregation would have a white coloration linked to the heterogeneity of the material, these different phases resulting in optical phenomena which make the material opaque. The Tg of a polyurethane coating is greater than or equal to 30° C. so as not to give it tackiness under the usual conditions of use.

There is a need for new crosslinked polyurethane coatings which have good mechanical properties, good adhesion to the substrate and high stability over time.

The applicant has discovered that replacing 1,4-butanediol (BDO) as chain extender with isosorbide makes it possible to improve the properties of the polyurethane coating obtained, in particular the adhesion to the substrate, the impact resistance and the resistance to folding. Furthermore, the use of isosorbide makes it possible to increase the Tg and the rigidity of the coating compared with the same coating obtained with BDO.

The polyurethane coating obtained with the composition of the present invention also has the advantage of being partly obtained from a raw material of natural origin. Indeed, in the current context of the gradual reduction of petroleum-based resources, it is increasingly advantageous to replace products of petroleum origin with products of natural origin.

SUMMARY OF THE INVENTION

One subject of the invention is thus a composition comprising:
- a polyol fraction comprising a polyol chosen from a polyester polyol, a polyether polyol, a polycarbonate polyol or a mixture thereof, said polyol being a diol or a mixture of diols;
- a polyisocyanate fraction comprising an aliphatic polyisocyanate;
- isosorbide;

in which the polyisocyanate fraction comprises a polyisocyanate with an —NCO functionality strictly greater than 2.

Another object of the invention is a process for manufacturing a polyurethane coating on a substrate, which comprises the following steps:
- depositing on the substrate a layer of the composition according to the invention, and then
- crosslinking the composition.

Another subject of the invention is a polyurethane coating that may be obtained by means of the process according to the invention.

DETAILED DESCRIPTION

In the description that follows, the expression "between . . . and . . . " should be interpreted as including the limits of the range described.

Polyurethane Coating Composition

The present invention relates to a crosslinkable polyurethane coating composition.

For the purposes of the present invention, the term "crosslinkable polyurethane coating composition" means a composition that is capable of providing a polyurethane coating after crosslinking of the composition.

For the purposes of the present invention, the term "polyurethane coating" means a crosslinked polyurethane deposited on a solid substrate in the form of a thin layer, for example a layer with a thickness of from 20 to 500 micrometers, in particular 20 μm, 50 μm, 100 μm, 150 μm, 200 μm, 250 μm, 300 μm, 350 μm, 400 μm or 450 μm. The coatings may, for example, be protective, decorative or surface-treatment coatings. Protective films, varnishes and paints are among the coatings for the purposes of the present invention.

For the purposes of the present invention, the term "crosslinking" means the formation of one or more three-dimensional networks by creation of chemical bonds between the polymer chains. A polymer may be crosslinked when it comprises a monomer unit bearing more than two functions that are reactive in polymerization. Thus, the crosslinked polyurethane of the invention is obtained by introducing into the polyurethane coating composition a polyol with an —OH functionality strictly greater than 2 and/or a polyisocyanate with an —NCO functionality strictly greater than 2. Crosslinking may notably be performed under the action of heat or by irradiation with a UV beam, optionally in the presence of a catalyst.

The crosslinkable polyurethane coating composition according to the invention differs from a thermoplastic polyurethane (TPU) composition and from an adhesive composition based on polyurethane.

Thus, the polyurethane coating obtained by crosslinking the composition according to the invention has a single glass transition temperature (Tg), said Tg being greater than or equal to 20° C., preferably greater than or equal to 25° C., more preferentially greater or equal to 30° C. The Tg of the polyurethane coating obtained by crosslinking the composition according to the invention may notably be measured by dynamic mechanical analysis or by differential scanning calorimetry.

Isosorbide

The composition according to the invention comprises isosorbide. The isosorbide is used as a chain-extender diol.

Isosorbide is a cycloaliphatic diol corresponding to the formula:

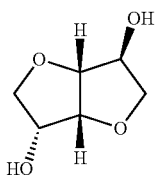

The term "isosorbide" as used in the present application encompasses all the stereoisomers (i.e. the enantiomers or diastereoisomers) of isosorbide, that is to say, inter alia, isoidide and isomannide.

Polyol Fraction

The composition according to the invention comprises a polyol fraction.

The polyol fraction comprises or consists of a polyol or a mixture of polyols.

For the purposes of the present invention, the term "polyol" means a compound with an —OH functionality greater than or equal to 2. The term polyol thus includes diols and triols. For the purposes of the present invention, isosorbide is not considered to be a polyol.

For the purposes of the present invention, the term "—OH functionality" means the total number of reactive hydroxyl functions per molecule of compound. The —OH functionality ($f_{OH}$) may be calculated from the hydroxyl number ($I_{OH}$) and the number-average molar mass of the polyol ($Mn_{polyol}$) according to the following formula:

$$f_{OH}=(I_{OH} \times Mn_{polyol})/56\ 100$$

The hydroxyl number may be measured by acetylation followed by back titration with potassium hydroxide according to the standard ISO 14900: 2001, Plastics—Polyols for the production of polyurethane—Determination of the hydroxyl number. The hydroxyl number is expressed in mg KOH/g which corresponds to the amount of KOH in mg which is necessary to neutralize 1 g of polyol.

The polyol fraction comprises or consists of a diol or a mixture of diols.

The polyol fraction may also comprise a triol.

According to a particular embodiment, the polyol fraction comprises or consists of a mixture of diols and triols.

The polyol of the polyol fraction may in particular have a molecular weight of between 400 and 4000 g/mol, preferably between 500 and 2000 g/mol and more preferentially between 600 and 1500 g/mol.

The polyol of the polyol fraction is a polyester polyol or a polyether polyol or a polycarbonate polyol. The polyester polyol, the polyether polyol and the polycarbonate polyol are preferably linear polyols which may contain aliphatic, alicyclic or heterocyclic monomer units.

For the purposes of the present invention, the term "linear polyol" means a polyol which does not comprise a side chain bearing a function that is reactive for polymerization.

The polyether polyol, also called polyalkylene ether polyol, is preferably a linear polyether bearing two hydroxyl end functions. The alkylene portion may comprise 2 to 10 carbon atoms, preferably 2 to 4 carbon atoms. It may notably be obtained by opening a cyclic ether, such as an epoxide, with a glycol. The polyether polyols according to the present invention comprise block or random copolyether glycols, notably block or random copolymers of ethylene oxide and of propylene oxide. Examples of polyether polyols according to the present invention are a polyethylene glycol (PEG), a polypropylene glycol (PPG), a poly(oxyethylene-oxypropylene) glycol, a polytetramethylene ether glycol (PTMEG) or a mixture thereof.

The polyester polyol is preferably a linear polyester bearing two hydroxyl end functions. It may be obtained by linear condensation of at least one glycol with at least one dicarboxylic acid or by reaction of a cyclic ester with a glycol. The polyester polyols according to the present invention comprise block or random copolyester glycols; such copolyester polyols may notably be obtained by using a mixture of at least two glycols and/or at least two dicarboxylic acids. The glycols used may comprise 2 to 8 carbon atoms, preferably 2 to 6 carbon atoms, such as ethylene glycol, propylene glycol, 1,3-propanediol, butylene glycol, 1,4-butanediol and 1,6-hexanediol. The dicarboxylic acids used generally contain 4 to 10 carbon atoms, such as succinic acid, glutamic acid, glutaric acid, octanedioic acid, sebacic acid, maleic acid, fumaric acid, adipic acid, azelaic acid, phthalic acid, isophthalic acid and terephthalic acid. The dicarboxylic acid used may be a dicarboxylic fatty acid, i.e. a saturated or unsaturated aliphatic dicarboxylic acid comprising from 8 to 44 atoms between the acid functions, which may be synthesized, for example, by dimerization of unsaturated aliphatic monocarboxylic acids or unsaturated aliphatic esters containing between 8 and 22 carbon atoms, such as linoleic and linolenic acid. The cyclic ester used is generally epsilon-caprolactone. Examples of polyester polyols according to the present invention are hydroxytelechelic polyesters of poly(ethylene adipate), poly(propylene adipate), poly(propylene-co-ethylene adipate), poly(butylene adipate), poly(ethylene-co-butylene adipate), or poly(caprolactone) diol type, copolymers of caprolactone and of lactide, or a mixture thereof.

The polycarbonate polyol is preferably a linear polycarbonate bearing two hydroxyl end functions. It may be obtained by linear condensation of at least one glycol with at least one alkyl carbonate derivative or phosgene. It may also be obtained by reaction between propylene oxide and $CO_2$. The polycarbonate polyols according to the present invention comprise block or random copolycarbonate glycols; such copolycarbonate polyols may notably be obtained by using a mixture of at least two glycols and of alkyl carbonate. The diols may be linear aliphatic diols, cyclic diols or heterocyclic diols.

According to a preferred embodiment, the polyol fraction comprises a polyol chosen from a polyethylene glycol (PEG), a polypropylene glycol (PPG), a polytetramethylene ether glycol (PTMEG), a poly(caprolactone) diol or a mixture thereof; preferably a PTMEG; more preferentially a PTMEG with a molecular weight of from 250 to 4000, preferably from 400 to 2000 g/mol.

The amount of polyol relative to the amount of isosorbide is adjusted so as to obtain a mole ratio of all the —OH functions of the polyol fraction to all the —OH functions of the isosorbide of between 0.2 and 2, preferably of between 0.3 and 1, more preferentially of between 0.4 and 0.6.

Polyisocyanate Fraction

The composition according to the invention comprises a polyisocyanate fraction.

The polyisocyanate fraction comprises or consists of a polyisocyanate or a mixture of polyisocyanates.

For the purposes of the present invention, the term "polyisocyanate" means a compound with an —NCO functionality greater than or equal to 2. The term "polyisocyanate" thus notably includes diisocyanates with an —NCO functionality equal to 2, triisocyanates with an —NCO functionality equal to 3, and also polyisocyanates with an —NCO functionality strictly greater than 2 and strictly less than 3.

For the purposes of the present invention, the term "—NCO functionality" means the total number of reactive isocyanate functions per molecule of compound. The —NCO functionality may be estimated by calculation after NCO back titration of the excess dibutylamine with hydrochloric acid (according to the standard EN ISO 14896-2006).

The polyisocyanate fraction comprises an aliphatic polyisocyanate.

For the purposes of the present invention, the term "aliphatic polyisocyanate" means a polyisocyanate which does not contain any aromatic rings. The term "aliphatic polyisocyanate" thus includes non-cyclic aliphatic polyisocyanates and cycloaliphatic polyisocyanates.

The polyisocyanate fraction comprises a polyisocyanate with an —NCO functionality strictly greater than 2. According to a particular embodiment, the aliphatic polyisocyanate has an —NCO functionality strictly greater than 2; preferably the aliphatic polyisocyanate is chosen from a diisocyanate trimer, more particularly a diisocyanate isocyanurate, a diisocyanate biuret or a diisocyanate iminooxadiazinedione corresponding to the following formulae:

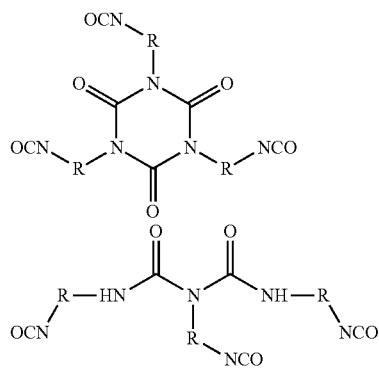
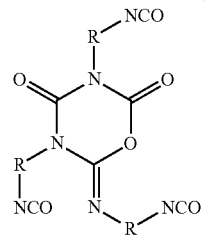

in which R is a $C_4$-$C_{30}$ alkylene group, preferably a $C_4$-$C_{20}$ alkylene group. For the purposes of the present invention, the term "$C_4$-$C_{30}$ alkylene group" means a divalent alkyl chain comprising 4 to 30 carbon atoms, which is saturated or partially saturated, linear, linear or branched, and which may comprise an aliphatic ring.

According to a particular embodiment, the aliphatic polyisocyanate is chosen from a pentamethylene diisocyanate trimer (t-PMDI), a hexamethylene diisocyanate trimer (t-HDI), an isophorone diisocyanate trimer (t-IPDI) or a mixture thereof, preferably t-IPDI or t-PMDI.

The polyisocyanate fraction of the composition according to the invention may also comprise an aliphatic diisocyanate. Preferably, the aliphatic diisocyanate is chosen from pentamethylene diisocyanate (PMDI), hexamethylene diisocyanate (HDI), isophorone diisocyanate (IPDI), methylene dicyclohexyl diisocyanate (HMDI or hydrogenated MDI) or a mixture thereof; more preferentially IPDI.

The polyisocyanate fraction may notably comprise at least 5 mol % relative to the —NCO functions, in particular at least 10 mol % relative to the —NCO functions, more particularly at least 15 mol % relative to the —NCO functions, of aliphatic polyisocyanate.

According to a particular embodiment, the polyisocyanate fraction of the composition according to the invention comprises:
1 to 40 mol %, preferably 2 to 30 mol %, relative to the —NCO functions, of aliphatic polyisocyanate; and
60 to 99 mol %, preferably 30 to 98 mol %, relative to the —NCO functions, of aliphatic diisocyanate.

The total amount of polyisocyanate relative to the amount of isosorbide and of polyol is adjusted so as to obtain a mole ratio of all the —OH functions of the polyol fraction and of the isosorbide to all the the —NCO functions of the polyisocyanate fraction of between 0.8 and 1.2, preferably of between 0.95 and 1.05.

Catalyst

The composition according to the invention may also comprise a catalyst. The catalyst makes it possible to accelerate the polymerization reaction and/or to increase the degree of polymerization of the polyurethane.

Examples of catalysts that may be introduced into the composition are organic or inorganic acid salts; organometallic derivatives of bismuth, of lead, of tin, of antimony, of uranium, of cadmium, of cobalt, of thorium, of aluminum, of mercury, of zinc, of nickel, of cerium, of molybdenum, of vanadium, of copper, of manganese or of zirconium; phosphines; organic tertiary amines; or a mixture thereof. Preferably, the catalyst is dibutyltin dilaurate.

According to a particular embodiment, the amount of catalyst is between 0.001% and 5%, preferably between 0.005% and 1.0% by weight relative to the total weight of the polyol fraction, of the polyisocyanate fraction and of the isosorbide.

Solvent

The composition according to the invention may also comprise a solvent.

Examples of solvents that may be introduced into the composition are ketones, hydrocarbon-based solvents, ethers, esters, nitriles, sulfones, dimethyl sulfoxide, aromatic compounds or a mixture thereof. Preferably, the solvent is chosen from 2-butanone, cyclopentanone, dimethyl isosorbide (DMI) or a mixture thereof, more preferentially a mixture of 2-butanone and DMI.

According to a particular embodiment, the amount of solvent is between 10% and 60%, preferably between 20% and 50% by weight relative to the total weight of the formulation.

Additives

The composition according to the invention may also comprise a spreading agent. The spreading agent makes it possible to obtain, before crosslinking, good spreading of the composition when it is applied to the substrate. The spreading agent may be particularly useful in preventing the formation of craters in the coating by lowering the surface tension of the composition.

An example of a spreading agent that may be introduced into the composition according to the invention is a polyether-modified polydimethylsiloxane such as BYK 307 sold by BYK. The amount of spreading agent in the composition is from 0.01% to 0.2%, preferably 0.05% to 0.15%, by weight relative to the total weight of the polyol fraction, of the polyisocyanate fraction and of the isosorbide.

The composition according to the invention may also comprise other additives, for example polymerization inhibitors, dyes, pigments, opacifiers, thermal or ultraviolet protection additives, antistatic agents, antibacterial agents, antisoiling agents or antifungals.

Preferably, the composition according to the invention comprises less than 10% and more preferentially less than 2% by weight of these additives, relative to the weight of the composition.

Process for Manufacturing the Crosslinkable Polyurethane Coating Composition

The composition according to the invention may be prepared by mixing the ingredients which constitute it, notably with stirring. The amount of solvent makes it possible to adjust the viscosity of the composition.

Process for Manufacturing the Polyurethane Coating

The process for manufacturing the polyurethane coating according to the invention comprises a step of depositing on a solid substrate a layer of the composition as described above.

The composition may be deposited using any means known to those skilled in the art, for example by dip-coating, by centrifugal coating, by "barcoater", by "tape casting", by spraying or using a brush or a roller. The thickness of the layer deposited is adjusted according to the thickness of the coating that it is desired to obtain. The thickness of the deposited layer may be, for example, between 100 nm and 2 mm, preferably from 100 to 500 micrometers. Preferably, the layer has a uniform thickness, so as to obtain a uniform final coating.

The substrate on which the coating is applied may be of any kind. These substrates may in particular be wood, metal, plastic, glass or paper substrates.

The process according to the invention also comprises a step of crosslinking the composition.

The crosslinking of the composition may notably be performed by heating. According to a particular embodiment, the heating is performed at a temperature ranging from 100° C. to 250° C., preferentially from 150° C. to 200° C. In particular, the temperature may be increased in temperature stages or else by using a temperature ramp.

The duration of the heating may notably be between 1 hour and 5 hours, preferably between 1 hour 30 minutes and 3 hours.

The heating may also be performed under vacuum.

The process according to the invention makes it possible to obtain a polyurethane coating which has advantageous properties. In particular, the coatings obtained may have at least one of the following properties:

good transparency;

a low refractive index;

high gloss;

good adhesion to the substrate;

high hardness;

good resistance to abrasion or wear;

good chemical resistance, to solvents, for example to water, or good water resistance, but also good resistance to bases and acids;

good impact resistance/impact strength; and good deformation resistance.

The coatings obtained, which are also subjects of the present invention, have properties that are at least as good as, if not better than, currently available coatings obtained with 1,4-butanediol as the chain-extender diol.

The invention will be understood more clearly in the light of the nonlimiting and purely illustrative examples that follow.

EXAMPLES

A. Preparation of Crosslinkable Compositions in Accordance (e.) or Not in Accordance (ce.) with the Invention:

The following products were used in the examples:

polyol: poly(tetramethylene glycol) of molecular weight 650 g/mol (PTMEG 650) or 1000 g/mol (PTMEG 1000) (Sigma-Aldrich)

polyisocyanate: pentamethylene diisocyanate trimer (t-PMDI) (Covestro) or isophorone diisocyanate trimer (t-IPDI) (Evonik)

diisocyanate: isophorone diisocyanate (IPDI) (Aldrich)

chain-extender diol: isosorbide (Roquette) or 1,4-butanediol (BDO) (Sigma-Aldrich)

solvent: 2-butanone and dimethyl isosorbide (Roquette)

additive: polyether-modified polydimethylsiloxane (BYK 307) (BYK)

catalyst: dibutyltin dilaurate (DBTDL) (Sigma-Aldrich)

Various compositions were prepared by mixing the monomers indicated in the table below with a (—OH polyol)/(—NCO polyisocyanate+diisocyanate)/(—OH chain extender) stoichiometry of 1/3.05/2. The monomers (i.e. the polyol, the diisocyanate, the polyisocyanate and the chain extender) are introduced into a solvent mixture comprising 2-butanone and dimethyl isosorbide (volume ratio 1:5) to obtain a concentration of 70% by weight of the monomers relative to the weight of the composition. The BYK 307 additive is added, to reduce the crater effects, in a percentage of 0.1% by weight relative to the weight of the monomers. The DBTDL catalyst is added in a percentage of 0.025% by weight relative to the weight of the monomers in order to accelerate the reaction (except for the CEx. 1 formulation which gelled before application).

| | Polyol | Diisocyanate (mol % of NCO functions) | Polyisocyanate (mol % of NCO functions) | Chain-extender diol |
|---|---|---|---|---|
| | | | MONOMERS | |
| Ex. 1 | PTMEG 650 | — | t-PMDI (100%) | Isosorbide |
| Ex. 2 | PTMEG 650 | IPDI (80%) | t-PMDI (20%) | Isosorbide |
| Ex. 3 | PTMEG 1000 | IPDI (80%) | t-IPDI (20%) | Isosorbide |
| CEx. 1 | PTMEG 650 | — | t-PMDI (100%) | BDO |
| CEx. 2 | PTMEG 650 | IPDI (80%) | t-PMDI (20%) | BDO |
| CEx. 3 | PTMEG 1000 | IPDI (80%) | t-IPDI (20%) | BDO |

B. Production of the Coatings on a Steel Support

A thin layer of crosslinkable composition as described above was deposited on steel plates (standardized Q-panel R44) using a Sheen Instruments 1133N bar-coater, equipped with a 150 μm bar so as to to cover the entire surface of the support with the minimum amount of composition.

The composition is then crosslinked in a vacuum oven under a vacuum of 100 mbar according to the following thermal cycle:
heating at 100° C. for 60 min;
increasing the heating temperature from 100° C. to 140° C. with a gradient of 2° C./min;
heating at 140° C. for 90 min;
increasing the heating temperature from 140° C. to 160° C. with a gradient of 2° C./min;
heating at 160° C. for 30 min.

C. Characterization/Evaluation of the Properties of the Coatings Thus Obtained

Impact Resistance (1 kg Ball at 1 m)

The impact resistance measurements were performed according to the standard ISO 6272: Paints and varnishes—Rapid deformation (impact resistance) tests—Part 1: falling-weight test, large area indenter.

Adhesion (Cross-Cut Test)

The adhesion measurements were performed in accordance with the standard ISO 2409 "Paints and varnishes—Cross-cut test".

Folding

The folding tests were performed by folding the support at 90° (coating on the inside and outside face). The resistance of the coating was then evaluated qualitatively at the level of the fold.

Glass Transition Temperature (Tg)

The Tg measurements (expressed in degrees Celsius (° C.)) were performed by differential scanning calorimetry (measured at the second pass −60° C. to 250° C., 20° C. min$^{-1}$).

| | Impact resistance | Adhesion | Folding | Tg (° C.) |
|---|---|---|---|---|
| Ex. 1 | Good | + (1) | OK | 30 |
| Ex. 2 | Good | ++ (0) | OK | 48 |
| Ex. 3 | Good | + (1) | Not performed | 43 |
| CEx. 1 | Poor | −− (4) | Tearing | 4 |
| CEx. 2 | Good | + (1) | OK | 14 |
| CEx. 3 | Good | −− (4) | Not performed | −10 |

The tests show that the coatings obtained after crosslinking of compositions containing isosorbide have a higher Tg than the corresponding coatings obtained with BDO. In addition, replacing BDO with isosorbide can also lead to an increase in the adhesion of the coating to the substrate and to an increase in its folding resistance (cf. Ex. 2 compared with CEx. 2).

The invention claimed is:

1. A crosslinkable polyurethane coating composition comprising:
   a polyol fraction comprising a polyol chosen from a polyester polyol, a polyether polyol, a polycarbonate polyol or a mixture thereof, said polyol being a diol or a mixture of diols;
   a polyisocyanate fraction comprising an aliphatic polyisocyanate chosen from a hexamethylene diisocyanate trimer (t-HDI), an isophorone diisocyanate trimer (t-IPDI) or a mixture thereof; and
   isosorbide;
   in which the polyisocyanate fraction comprises a polyisocyanate with an —NCO functionality strictly greater than 2; the mole ratio of all the —OH functions of the polyol fraction and of the isosorbide to all of the —NCO functions of the polyisocyanate fraction is between 0.95 and 1.05; and the mole ratio of all the —OH functions of the polyol fraction to all the —OH functions of the isosorbide is between 0.3 and 1.

2. The composition as claimed in claim 1, wherein the polyurethane coating obtained by crosslinking the composition has a single glass transition temperature Tg, said Tg being greater than or equal to 20° C.

3. The composition as claimed in claim 1, wherein the mole ratio of all the —OH functions of the polyol fraction to all the —OH functions of the isosorbide is between 0.4 and 0.6.

4. The composition as claimed in claim 1, wherein the polyol is chosen from a polyethylene glycol (PEG), a polypropylene glycol (PPG), a polytetramethylene ether glycol (PTMEG), a poly(caprolactone) diol, or a mixture thereof.

5. The composition as claimed in claim 1, wherein the polyol fraction also comprises a triol.

6. The composition as claimed in claim 1, wherein the polyisocyanate fraction also comprises an aliphatic diisocyanate.

7. The composition as claimed in claim 1, wherein the polyisocyanate fraction comprises at least 5 mol % of aliphatic polyisocyanate relative to the —NCO functions of the polyisocyanate fraction.

8. The composition as claimed in claim 1, wherein the polyisocyanate fraction comprises:
   1 to 40 mol % of aliphatic polyisocyanate relative to the —NCO functions of the polyisocyanate fraction; and
   60 to 99 mol % of aliphatic diisocyanate relative to the —NCO functions of the polyisocyanate fraction.

9. A process for manufacturing a polyurethane coating on a substrate, comprising the following steps:
   depositing on the substrate a layer of the composition as claimed in claim 1, and then
   crosslinking the composition.

10. A polyurethane coating which may be is obtained by means of the process as defined in claim 9.

11. The composition as claimed in claim 6, wherein the aliphatic diisocyanate is chosen from pentamethylene diisocyanate (PMDI), hexamethylene diisocyanate (HDI), isophorone diisocyanate (IPDI), methylene dicyclohexyl diisocyanate (HMDI or hydrogenated MDI), or a mixture thereof.

* * * * *